Aug. 25, 1953      A. GLASER      2,650,040
FISHING REEL
Filed Dec. 20, 1949
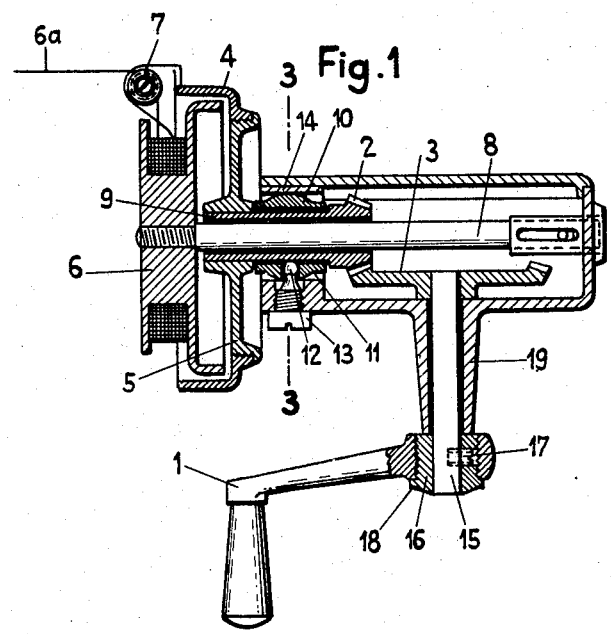
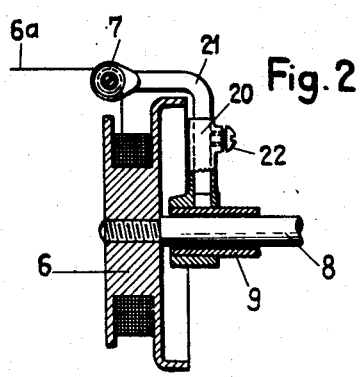
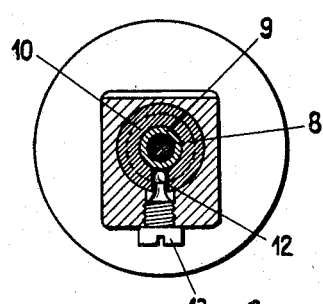
Inventor
Albert Glaser
By Singer, Stern & Carlberg
attys.

UNITED STATES PATENT OFFICE 2,650,040

FISHING REEL

Albert Glaser, Zurich, Switzerland

Application December 20, 1949, Serial No. 134,089
In Switzerland December 23, 1948

2 Claims. (Cl. 242—84.1)

Some fishing reels are so-called stationary reels, which are principally characterised by a non-rotating line spool, from which the line is cast and on which it is later wound up by means of a drum encircling the spool. Depending on the size and kind of fish to be caught, and on whether fishing is in a river, deep sea, etc., various methods of fishing are adopted. For instance, when fishing for certain kinds of fish a light reel and a very fine line are required. Then the weight of the line spool and the drum must be very light. For catching larger fish thicker lines are necessary; further, fishing in lakes at great depths needs much longer lines. These two requirements can only be fulfilled with a bigger drum and spool. Accordingly, reels graded in various sizes have also been developed.

According to the invention, the stationary reel here in question, with rotating guide for the line, is constructed in such a way that at least the part of the guide situated outside the line spool can be rendered suitable for spools of different sizes. For example, this may be accomplished by a multiple-part construction of the drum carrying the line guide or by the provision of an adjustable arm for the line guide.

Known reels have frequently the defect that the axle carrying the line spool jams. By considerably increasing the running clearance, such jamming could certainly be avoided, but great running clearance entails severe wear, besides adversely affecting the correct running of the whole mechanism.

The reel according to the invention avoids this drawback, in that the drum serving for winding the line in is set in rotation through a self-adjusting shaft.

Further, reels are also known which have a winding-crank that screws firmly onto the threaded winding-shaft when the crank is rotated in the winding-in direction. When the crank is rotated in the opposite direction, particularly if the reel is locked against rotation in that direction, the crank unscrews from its shaft and can thus be removed from the reel. This has the advantage that, if the crank is inadvertently turned or if it is struck when the reel is dropped, damage can be avoided, even if this turning occurs in the opposite direction to locking. Besides that, when the crank has been removed the reel takes up less room and may therefore be fitted into a small case.

Experience, however, has shown that cranks are often lost by being mislaid or by automatically working loose during fishing. The present invention relates to a construction of such a type that the crank is indeed uncoupled from the winding shaft when rotation takes place in the direction opposite to winding the line in, but it nevertheless remains on the reel and is thus secured against falling off.

Fig. 1 forms an axial section through a first form of the invention,

Fig. 2 an axial section through a second form of the invention, and

Fig. 3 a section on the line 3—3 of Fig. 1.

In the form of execution according to Fig. 1, the crank 1 acting through the toothed gears 2, 3 sets the drum 4, 5 into rotation. The drum ring 4 and its line-guiding roller 7 surround the line spool 6, by which the line 6a, sliding over the line-guiding roller, is wound in. In order to obtain a cross winding, the sliding shaft 8 and with it the line spool 6 is moved backwards and forwards by about the width of a line groove at each rotation of the crank, this reciprocating movement being effected by a mechanism that is well known and is not shown, since, per se, it forms no part of the present invention. In contrast to known executions, the drum consists of two parts 4 and 5 which can be fixed together in a screw-threaded connection. The outer part or ring 4 is screwed onto the inner part or disc 5. The direction of the screw threads connecting drum parts 4 and 5 together is preferably so related to the direction in which the line guide moves about the spool to wind up the line thereon that the pull exerted through the thread acts to screw the drum parts together. The two drum parts could also be conected by a bayonet joint, instead of by a screw-thread. The drum disc 5 is generally also associated with other drum parts not shown in the drawing and is therefore not suitable for being quickly dismantled by an ordinary unskilled person. The construction of the drum is consequently chosen in such a way that the diameter of the drum can be altered by exchanging extremely simple drum rings, without other parts of the reel having to be dismantled.

In this way, any fisherman is enabled, without having expert knowledge and even when out fishing, to convert his reel for various fishing needs in a simple and rapid manner with the certainty that it will function reliably.

As mentioned, the shaft 8 is supported so that it cannot jam. For this purpose the bearing bushing 10 has on its periphery an annular bulge of ball-shaped outline and is carried in a cylindrical bore 11. The ballhead 12 of the screw 13 engages in a cylindrical hole in the bearing bushing 10 and fixes the latter in the axial direction. As pivot point for the bearing bushing 10, the ballhead 12 allows turning with respect to its axis of rotation in any plane passing through the sliding-shaft axis, thus bringing the axes into agreement. When the bevel-wheel shaft 9, the bearing bushing 10 and the sliding shaft 8 have been mounted together, their axes of rotation are also coincident. After these parts have been introduced into the cylindrical bore 11, the whole system can be moved universally from the sliding shaft 8, with rolling movement of the bearing bushing. Now, if the sliding shaft 8 is pushed into the guide sleeve 14, the bevel-wheel shaft 9 and the bearing surrounding it have automatically set themselves by axial agreement, this resulting in running free from jamming.

The crank 1 is secured by means of the following arrangement: A threaded collar 16 is firmly connected to the operating shaft 15 by the screw 17. The collar 16 is provided with a stop 18, against which the crank 1, threaded on the collar, is held as soon as it is turned in the direction to wind the line in. If the crank 1 is turned in the opposite direction, for instance against the locked reel mechanism, the crank moves away from the shoulder. If the crank continues to move far enough, it comes loose on an extension 19 of the housing through which the shaft 15 extends and is mounted, the extension being smaller in diameter than the threaded portion of collar 16 and the opening in the crank 1x. Instead of a screwed connection, a bayonet joint might also be adopted.

A further possibility of execution, which can be used instead of the two-part drum 4, 5, is illustrated in Fig. 2. In place of a drum, a two-part radially displaceable arm surrounds the line spool. One arm part 20 is connected to the hollow shaft 9; the second arm part 21, carrying the line-guiding roller 7, is borne displaceably in the arm 20, and can be adjusted in accordance with the size of the spool and fixed by means of the set screw 22.

What I claim is:

1. In a fishing reel, a housing having mounted therein an axially reciprocable shaft extending with one end outside said housing, a line spool fixedly mounted on the outwardly extending end of said reciprocable shaft, a tubular shaft rotatably mounted on said reciprocable shaft, means for preventing axial displacement of said tubular shaft including a bearing bushing having a ball-shaped outline mounted non-rotatably in a cylindrical bore provided at one end of the housing, said bearing bushing surrounding said tubular shaft and having a radial hole, a pin attached to said housing and extending loosely into said radial hole, manually operable means mounted in said housing for rotating said tubular shaft, a circular drum disc integrally formed with a hub member fixedly mounted on said tubular shaft, said drum disc having a diameter of a size substantially in excess of the greatest cross-sectional dimension of said bearing bushing, a drum ring provided with means thereon to exchangeably secure it to the circumference of said drum disc and having mounted thereon a line guiding roller for guiding fishing line toward and away from said line spool on said axially reciprocable shaft.

2. In a fishing reel, a housing having mounted therein an axially reciprocable shaft extending with one end outside said housing, a line spool fixedly mounted on the outwardly extending end of said reciprocable shaft, a tubular shaft rotatably mounted on said reciprocable shaft, means for preventing axial displacement of said tubular shaft including a bearing bushing having a ball-shaped outline mounted non-rotatably in a cylindrical bore provided at one end of the housing, said bearing bushing surrounding said tubular shaft and having a radial hole, a pin attached to said housing and extending loosely into said radial hole, manually operable means mounted in said housing for rotating said tubular shaft, said manually operable means including a manually rotatable shaft extending at right angles to said reciprocable shaft, a bearing in said housing for supporting said manually operable shaft, and bevel gear means within said housing for operatively connecting said tubular shaft with said manually rotatable shaft, a circular drum disc integraly formed with a hub member fixedly mounted on said tubular shaft, said drum disc having a diameter of a size substantially in excess of the greatest cross-sectional dimension of said bearing bushing, a drum ring provided with means thereon to exchangeably secure it to the circumference of said drum disc and having mounted thereon a line guiding roller for guiding fishing line toward and away from said line spool on said axially reciprocable shaft.

ALBERT GLASER.

References Cited in the file of this patent

UNITED STATES PATENTS

| Number | Name | Date |
| --- | --- | --- |
| 2,103,465 | Kinzie | Dec. 28, 1937 |
| 2,228,394 | Marvin et al. | Jan. 14, 1941 |
| 2,314,616 | Gaire | Mar. 23, 1943 |
| 2,498,987 | Duncan | Feb. 28, 1950 |

FOREIGN PATENTS

| Number | Country | Date |
| --- | --- | --- |
| 649,232 | France | Aug. 27, 1928 |
| 354,960 | Great Britain | Aug. 20, 1931 |
| 373,786 | Great Britain | June 2, 1932 |
| 409,833 | Great Britain | May 10, 1934 |
| 47,178 | France | Nov. 7, 1936 |
| | (Addition to No. 789,024) | |